United States Patent [19]

Vest

[11] 3,885,164
[45] May 20, 1975

[54] ANTI-THEFT SYSTEM FOR AUTOMOTIVE VEHICLES

[76] Inventor: Gary W. Vest, 4480 Broadview Rd., Cleveland, Ohio 44109

[22] Filed: June 24, 1974

[21] Appl. No.: 482,750

[52] U.S. Cl. .............. 307/10 AT; 340/64; 180/114; 315/209; 123/46.5
[51] Int. Cl. ........................................... B60r 25/00
[58] Field of Search ............ 307/10 AT; 340/63, 64; 180/114; 315/209; 123/46.5

[56] References Cited
UNITED STATES PATENTS
3,634,724   1/1972   Vest .............................. 307/10 AT Primary Examiner—Herman Hohauser
Attorney, Agent, or Firm—Bosworth, Sessions & McCoy

[57] ABSTRACT

A security system adapted to be connected to an engine ignition circuit for disabling an automotive vehicle. The system includes a security circuit with an impedance component that downgrades the ignition capabilities and prevents or retards engine firing and operation. The security circuit is automatically enabled each time the ignition key switch is opened. When the ignition key is subsequently closed, the security circuit will remain enabled until a concealed magnetic proximity switch is closed by bringing a magnet in close proximity to the hidden switch. The switch energizes a relay with contacts that normally keep the impedance component in the ignition circuit but which, when the relay is energized, remove the impedance component so that the ignition circuit is operative. The relay has a holding circuit means that keeps it energized until the ignition switch is turned off even though the magnetic proximity switch is open.

8 Claims, 1 Drawing Figure

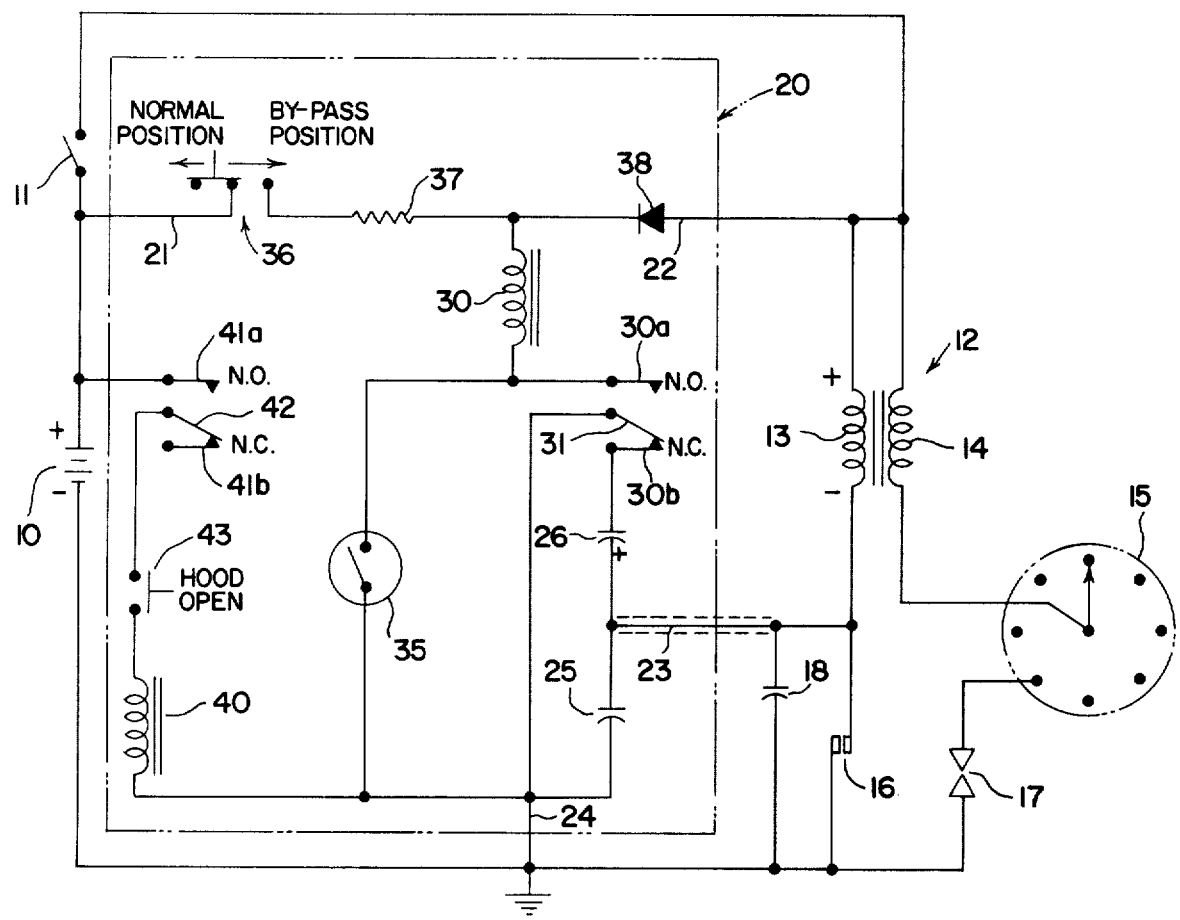

ANTI-THEFT SYSTEM FOR AUTOMOTIVE VEHICLES

BACKGROUND OF THE INVENTION

This invention relates to security devices for automotive vehicles and especially to devices adapted to both disable the engine ignition system of the vehicle and prevent tampering and attempts to defeat the security system. More particularly, the invention relates to an improvement in the automobile anti-theft system disclosed in my U.S. Pat. No. 3,634,724.

According to my U.S. Pat. No. 3,634,724, a theft prevention circuit is connected to an automotive vehicle ignition circuit that includes as conventional elements a distributor, spark plugs operatively connected to the distributor, a power supply (battery, generator, alternator), a condenser, and a transformer or coil with primary and secondary windings. The theft prevention circuit includes a circuit component such as an impedance element and a switch for connecting the element in parallel with one of the conventional ignition circuit components such as the condenser, to reduce the voltage developed across the condenser or other component sufficiently to prevent the spark plugs from maintaining ignition. The result is that when starting is attempted the engine will appear to be on the verge of continuous firing but will never actually start.

a disadvantage to this system is that if a car theft is aware that the system has been installed he may defeat its purpose by throwing the actuating switch to the open position himself or by simply removing the external impedance element from the ignition circuit. Another problem that can occur is that the vehicle operator upon turning off the ignition key may forget to switch on or enable the security circuit since the circuit is not automatically enabled whenever the ignition key is turned off.

The security system of the present invention, however, resolves the difficulties and disadvantages indicated above and affords other features and advantages heretofore not obtainable.

SUMMARY OF THE INVENTION

It is among the objects of the invention to defeat attempts to steal automobiles containing a security system for disabling the motor vehicle ignition circuit.

Another object is to protect a security system in the ignition system of an automobile against tampering by thieves.

Still another object is to provide an improvement in the automotive vehicle system disclosed in my U.S. Pat. No. 3,634,724 by automatically enabling the system when the ignition key switch is shut off and by rendering the automotive vehicle ignition system inoperative in case the security circuit is physically cut out of the system.

These and other objects are accomplished by means of an improved automobile security system for a vehicle ignition circuit that includes a distributor, a plurality of spark plugs operatively connected to the distributor, a power supply (battery, generator etc.), a condenser and a transformer or coil with primary and secondary windings. The improvement comprises a theft prevention circuit including an external circuit component such as an impedance element, and a relay with contacts adapted to be series connected with the impedance element and with its coil adapted to be energized by the power supply. The relay is energized by means of a magnetic proximity switch preferably located in a concealed location within the passenger compartment of the vehicle.

A typical magnetic proximity switch is a hermetically sealed reed switch of well-known design and construction. The switch may be closed prior to starting the vehicle engine only by bringing a magnetic field producing device (e.g., a magnet) in close proximity to the concealed location of the switch.

When the switch is open (and the relay de-energized) the theft prevention circuit is enabled and is effective to limit the level of any transient surge of sparking voltage sufficiently to prevent the spark plugs from maintaining engine firing.

The relay is provided with a holding circuit so that once it is energized it remains energized until the ignition key switch is turned off. When the ignition key switch is turned off the relay is de-energized so that its relay contacts move to their normally closed position to switch the theft prevention circuit into the engine ignition circuit. In this condition the disabling circuit component is placed in parallel with the respective component of the ignition system.

According to one aspect of the invention the normal condenser of the ignition system as supplied for conventional operation is removed and replaced by a condenser with a capacitance insufficient to sustain ignition and still another special capacitor is placed in parallel with it to produce the desired capacitance. The other capacitor is located remotely within the theft prevention unit. In this way an attempt to defeat the system by cutting the leads between the theft prevention device and the condenser would not be effective to enable the car to be started.

According to another feature of the invention, a bypass switch is provided so that the theft prevention circuit may be switched out of the ignition system if the operator does not wish to have the system automatically enabled when he turns off the ignition key switch. Closing the bypass switch, however, once the security circuit is set does not permit a thief to move the switch back to its normal position and be able to start the car by jumping the ignition key switch. Once the ignition key switch has been turned off the bypass switch in its normal position the security circuit may not be deactivated until the magnetic proximity switch is closed to energize the relay coil.

According to still another aspect of the invention, two sets of relay contacts are provided one of which energizes a hood lock solenoid to keep a hoodlock in locked position and prevent a thief from gaining access to the engine compartment of the vehicle.

BRIEF DESCRIPTION OF THE DRAWING

FIG. 1 is a schematic diagram of an engine ignition system for an automotive vehicle with an anti-theft circuit (indicated as shown within a dashed line block) connected thereto in accordance with the invention.

DESCRIPTION OF THE PREFERRED EMBODIMENT

Referring more particularly to the drawing, FIG. 1 shows a typical engine ignition circuit for a motor vehicle with a special anti-theft circuit associated therewith in accordance with the invention.

The conventional ignition system includes a battery 10 a conventional key operated ignition switch 11, a transformer 12 having a primary winding 13 and a secondary winding 14, a distributor 15 with breaker points 16 connected between the primary winding 13 and ground, and spark plugs 17 (only one being shown for the purpose of illustration) intermittently connected by the distributor to the secondary winding of the transformer 12. The system normally includes a condenser connected in parallel across the breaker points 16 and having a capacitance normally around 0.3 microfarads.

In accordance with the invention, the normal 0.3 microfarad condenser is replaced by a special condenser 18 having a capacitance of about 0.005 microfarads which is insufficient to provide adequate sparking voltage.

The theft prevention circuit of the invention includes components housed in a suitable casing 20 and having leads 21 and 22 connected across the ignition switch 11, a shielded lead 23 extending from the casing 20 and connected between the primary coil 13 and the condenser 18, and a ground lead 24.

In order to provide the necessary capacitance connected in parallel across the breaker points 16 (i.e., approximately 0.3 microfarads) another capacitor 25 having a capacitance of about 0.47 microfarads is connected within the casing 20 in parallel with the capacitor 18. The equivalent capacitance of the parallel elements 18 and 25 and the reactive impedance resulting from the length of shielded cable 23 is approximately 0.3 microfarads. With this arrangement, any attempt to cut the leads between the casing 20 and the ignition circuit will result in only the capacitor 18 remaining in the circuit. As indicated above, this capacitor is insufficient for the purpose of sustaining engine ignition and would thus prevent operation of the vehicle engine after the thief has cut through the leads.

In accordance with the invention, an additional circuit component, which in this case is a capacitor 26, is connected in parallel across the equivalent capacitance provided by the capacitors 18 and 25 and the coaxial line 23. In this instance, the reactive element 26 is a 100 microfarad (20 volt DC) capacitor. When the capacitor 26 is placed in operating condition in the circuit, it is effective to reduce the voltage developed across the equivalent capacitance of the elements 18 and 25 sufficiently to prevent the spark plugs 17 from maintaining engine firing. With this arrangement the ignition system will be effective to provide a voltage at the spark plugs but the magnitude is reduced sufficiently to prevent consistent sparking. The result is that when starting is attempted the engine will appear to be on the verge of starting but will never actually start.

The reactive element 26 is switched into the circuit by means of a relay including a coil 30 and contacts 30a and 30b. The relay switch arm 31 is normally closed so as to engage the contact 30b. In this condition, the ignition circuit is inoperative as will be apparent from FIG. 1 since the capacitor 26 is connected in the ignition circuit with the effect described above. When the relay coil 30 is energized, the switch arm 31 will move into engagement with the contact 30a so as to remove the reactive element 26 from its operative condition in the ignition circuit.

The relay coil 30 is energized by a concealed magnetic proximity switch or reed switch 35 which is connected between the relay and ground. The switch 35 is located at the option of the vehicle owner in a concealed location which may be behind door paneling, upholstery or other furnishings in the passenger compartment of the vehicle and has a normally open position to de-energize the relay coil 30.

The reed switch 35 may be closed by bringing a small magnet in close proximity to its concealed location. When this is done the magnetic field is sensed by the reed switch 35 to close the switch contacts and thus energize the relay coil 30. Once the relay is energized the switch arm 31 engages the contact 30a to provide a holding circuit that keeps the relay in its energized condition as long as the key operated ignition switch 11 is in its closed position. Thus the magnet may be immediately removed from its position in close proximity to the reed switch 35 without de-energizing the relay coil 30.

A bypass switch 36 and a resistor 37 (e.g., 390 ohms) are located in series between the relay coil 30 and the battery 10. It will be noted that the anti-theft circuit is activated every time the ignition key switch 11 is switched to the off position and that the ignition circuit cannot be enabled thereafter until the reed switch 35 is closed. The bypass switch 36 which is normally in an open position (FIG. 1) can be closed to prevent the anti-theft circuit from being activated when the ignition key is turned off, if desired. When the bypass switch 36 is closed, the coil 30 will remain energized when the ignition key switch 11 is turned off so that the vehicle may be started again without closing the reed switch 35.

A diode 38 (e.g., 0.5 amp, 25 v rating) is connected between the primary coil 13 and the relay coil 30 to allow the relay coil to be energized when the ignition switch is on but which prevents the bypass circuit from supplying power to the transformer 12 when the bypass switch 36 is closed.

If the ignition key switch 11 is turned on (assuming the anti-theft circuit is activated) and an attempt is made to start the engine without closing the contacts of the reed switch 35, the additional circuit component (in this case the 100 mfd capacitor) of the anti-theft circuit will not be removed from the ignition circuit and the engine cannot be effectively operated. It will also be noted that if the engine should stall with the ignition key switch in the on position the car may be restarted without any need to close the Reed switch contacts.

As an additional security feature, the vehicle is provided with a hood lock solenoid 40 which serves to keep the hood in a locked position as long as the relay coil 30 is energized. The hood lock solenoid 40 is connected across the battery by means of an additional set of relay contacts 41a and 41b and switch arm 42 associated with the relay coil 30. The switch arm 42 is in an open position (engaging contact 41b) to de-energize the hood lock solenoid 40 and keep the hood latched. The hood may be unlatched only when the relay coil 30 is energized and the switch arm 42 moved to its normally open position. An additional push button switch 43 is located within the vehicle so that when the switch 41 is closed with the switch arm 42 in the open position the solenoid 40 is energized and the hood may be opened.

While the invention has been shown and described with respect to a specific embodiment thereof this if for the purpose of illustration rather than limitation and other variations and modifications of the specific device herein shown and described will be apparent to those skilled in the art all within the intended spirit and scope of the invention. Accordingly, the patent is not to be limited in scope and effect to the specific device herein shown and described nor in any other way that is inconsistent with the extent to which the progress in the art has been advanced by the invention.

I claim:

1. In an ignition circuit including an ignition key switch, a distributor having a set of contacts, a plurality of spark plugs operatively connected to said distributor, a voltage supply source and at least one electrical component operatively connected between said voltage supply source and said distributor for causing a sparking voltage for said spark plugs sufficient to cause and maintain engine firing, a theft prevention device comprising:

an impedance component, a relay adapted when de-energized by said voltage supply source to switch said impedance component into operating condition in said ignition circuit to limit the level of any transient surge of sparking voltage developed across said ignition circuit electrical component sufficiently to prevent said spark plugs from maintaining engine firing magnetic proximity switch means adapted when activated to energize said relay coil, separate magnetic means adapted to be carried by a vehicle operator for activating said proximity switch when placed in the vicinity thereof, holding circuit means operatively connected to said relay for holding said relay energized after said proximity switch closes whereby said relay is energized until said ignition key switch is open.

2. A device as defined in claim 1 wherein said sparking-voltage-causing electrical component is the ignition system condenser.

3. A device as defined in claim 2 wherein said impedance component of said theft prevention device comprises a reactive element.

4. A device as defined in claim 3 wherein said reactive element is a capacitor.

5. A device as defined in claim 2 wherein said ignition condenser comprises two capacitors connected in parallel relation and including one capacitor remote from said theft prevention device and having a capacitive reactance of insufficient magnitude to cause engine firing, and another capacitor located with said theft prevention device whereby the equivalent capacitive reactance of said parallel capacitors is of sufficient magnitude to cause engine firing.

6. A device as defined in claim 1 including a hood latch, a solenoid adapted to lock said hood latch when de-energized and to unlock said hood latch when energized, and switch means associated with said relay to energize said solenoid when said relay is energized.

7. A device as defined in claim 1 including a bypass switch operatively connected between said power supply source and said relay, said switch adapted when closed to energize said relay after said ignition key switch is opened.

8. A device as defined in claim 1 wherein said sparking-voltage-causing electrical component is electrically interconnected to the ignition circuit through means of the theft prevention device.

* * * * *